(12) United States Patent
Harris

(10) Patent No.: US 6,314,306 B1
(45) Date of Patent: Nov. 6, 2001

(54) TEXT MESSAGE ORIGINATOR SELECTED RINGER

(75) Inventor: Michael J. Harris, Oceanside, CA (US)

(73) Assignee: Denso Corporation (JP)

(*) Notice: Subject to any disclaimer, the term of this patent is extended or adjusted under 35 U.S.C. 154(b) by 0 days.

(21) Appl. No.: 09/232,882

(22) Filed: Jan. 15, 1999

(51) Int. Cl.[7] .................................................. H04B 1/38
(52) U.S. Cl. ........................ 455/566; 455/420; 455/466
(58) Field of Search .................................. 455/566, 567, 455/418, 419, 420, 466; 379/373, 374, 375, 142, 252; 340/825.44, 825.54, 825.55

(56) References Cited

U.S. PATENT DOCUMENTS

| | | | |
|---|---|---|---|
| 5,220,599 | * | 6/1993 | Sasano et al. ......................... 379/375 |
| 5,307,059 | * | 4/1994 | Connary et al. ...................... 379/374 |
| 5,574,771 | * | 11/1996 | Driessen et al. ...................... 455/566 |
| 5,966,652 | * | 10/1999 | Coad et al. .......................... 455/566 |
| 6,029,065 | * | 2/2000 | Shah ..................................... 455/418 |
| 6,070,053 | * | 5/2000 | Yamashita ............................ 455/567 |

* cited by examiner

Primary Examiner—Nay Maung
Assistant Examiner—Quochien Vuong
(74) Attorney, Agent, or Firm—Fish & Richardson P.C.

(57) ABSTRACT

A text message originated ringer operates to carry out some operation based on an embedded control code in the message. The message includes all text, but some of the text characters are reserved. A control sequence, also in text, is contained between two reserved text characters. That control sequence is used to control the ringer in the remote phone. The control sequence is not displayed as part of the text message, but instead is only used as the control.

11 Claims, 2 Drawing Sheets

TEXT MESSAGE ORIGINATOR SELECTED RINGER

BACKGROUND OF THE INVENTION

Mobile cellular telephones can include the capability of delivering a text message to a phone. The telephone is of the type shown in FIG. 1. The phone includes an alphanumeric display 112 which is used for various features including caller ID, and reading from the database memory of telephone numbers. This display can also be used to deliver messages, including numeric pages or text pages.

A typical mechanism of sending a page is via an Internet site used to form a message using electronic mail. Other alphanumeric paging origination devices can also be used.

Telephones can also have the capability of signaling the user via a number of different ringing tones.

SUMMARY OF THE INVENTION

The present system creates a page that includes control which effectively adds extra parsing logic to the text message. This extra parsing logic becomes a command to the mobile device receiving the message. The command enables the mobile device to carry out some function which is contained in the parsing logic.

In a preferred mode, the parsing logic includes a ringer option, which can include one ring type, or a series of ring types to be used in a sequence. The mobile device receiving the message does not display the commands referencing the extra parsing logic. Instead, they carry out an operation based on the extra parsing logic. In a preferred mode, this operation includes selecting a ringer to be played to the user when the page is received.

DESCRIPTION OF THE PREFERRED EMBODIMENTS

Figure 1:
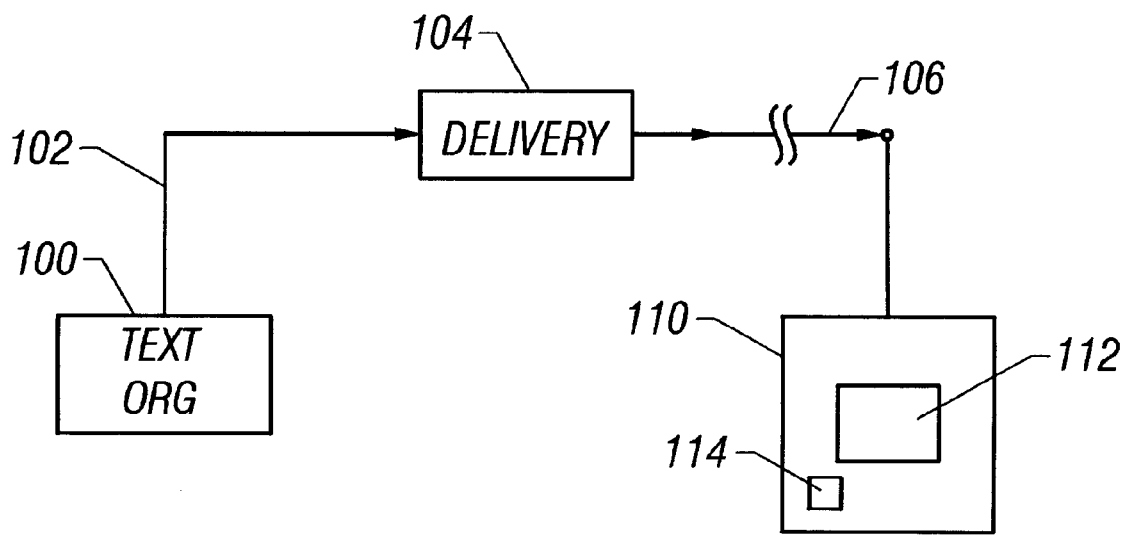
FIG. 1 shows a block diagram of the overall system.
Figure 2:
FIG. 2 shows an exemplary text message with an embedded ring command.

The basic operation is shown with respect to the preferred embodiment shown in FIG. 1. A text origination device 100 can be an Internet site, or dedicated pager-type device. The text originator device produces a text message 102 which is sent to a text delivery service 104. The text delivery service sends a wireless message 106 addressed to the mobile device 110. The wireless message 106 is typically displayed on the display 112 of the mobile device 110. The message is of the form shown in FIG. 2. An alphanumeric portion of the message 200 says, "Meet me." This is the normal kind of alphanumeric message sent by such systems. The additional parsing logic portion 210 is held between reserved characters 212 and 214, which signal the boundaries of the control. These characters are defined as characters that cannot be used during normal operation of the alphanumeric paging system. Anything within those characters is then taken as a control code for the mobile telephone 110. In this case, a ring command is within the control code. The ring command here includes commands 07, 08, and 09. This tells the ringer to ring using ring number 07, then ring number 08, then ring number 09, essentially playing a sequence of rings. When the user receives the message, the user hears the selected ring. This can therefore represent a tone that is unique to the user. For example, person X may always use the tones 07, 08, and 09, so that the mobile user has an indication of person X before investigating what the page says. This allows the special sequence of tones to effectively become a "signature".

Figure 3:
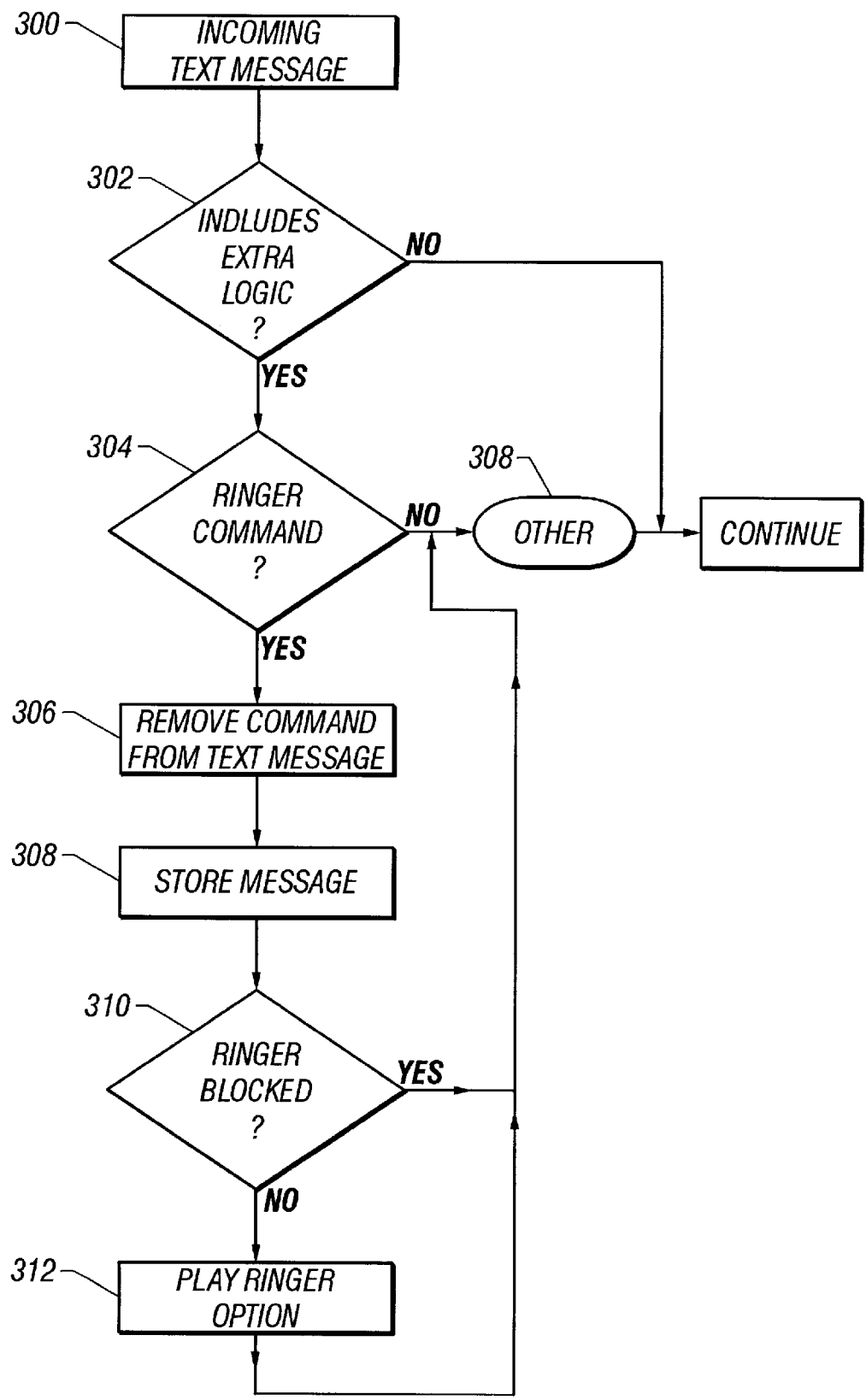
FIG. 3 shows a flowchart of operation of the preferred system.

The phone 110 includes a microprocessor 114 which carries out standard control tasks as is well known in the art. The processor 114 executes the usual flowchart for controlling the phone, but also executes the additional flowchart for processing a text message as shown in FIG. 3.

Step 300 represents an incoming text message. At step 302, the system detects whether the incoming text message includes extra parsing logic. This can be detected, for example, by looking for the reserved control sequence. Since text(ASCII) characters are used as the control sequence, the message can be sent over a normal text channel without change to the cellular infrastructure.

If there is extra information, the system then determines what the information represents. Step 304 determines whether the extra logic is a ringer command, the preferred command discussed according to this embodiment. It should be understood, however, that the command in step 304 could also represent other commands, represented generically. by the "others" at 306. Any remote control of any aspect of the phone, for example, is possible. It is possible to control a vibrator of the phone, to control turning the light in the phone on and off, or other operations. The preferred mode is a ringer command. Step 304 detects a ringer command. When this is detected, step 306 first removes the command from the text message, so that the command will not be displayed as part of the received text message. The message is then stored at step 308.

At step 310, the system determines if the ringer has been blocked by the owner of the phone. Ringer blocking is an option on the phone, selectable via the menu of the phone's internal functions. This prevents the remote user from selecting the user's ringer if the user would prefer that the remote control of the ringer be blocked. If the ringer is blocked, control passes to processing of the other element at step 306. If not, the system commands playing the ringer option at step 312, followed by control passing to step 306 to determine other options to be possibly followed.

After step 306, the process continues using the normal kind of processing as well known in the art.

Although only a few embodiments have been disclosed in detail above, those of ordinary skill in the art certainly understand that modifications are possible in the preferred embodiment without departing from the preferred teaching. For example, as discussed, control of items other than ringer is certainly possible.

All such modifications are intended to be encompassed within the accompanying drawings, wherein:

What is claimed is:

1. A message for a text messaging system, comprising:
   a first textual portion, including a textual message to be played to a user; and
   a second control portion, including control information that indicates a specified operation for a remote telephone that is to receive that text message, wherein said specified operation includes selection of at least one ringer tone to be played on said remote telephone, and wherein said control information includes reserved text characters, which are defined to exist only as part of control characters for controlling said telephone, and which delineate the control operation.

2. A method of operating a text messaging system, comprising:

producing a text message to be displayed on a remote mobile telephone, and also producing a control code to control some aspect of operation of the remote mobile telephone;

embedding said control code in the same message with said text message, and in a way that allows the remote mobile telephone to determine that said control code is different than said text message;

determining, at said remote mobile telephone, a control code within said text message;

removing said control code from said text message;

displaying said text message on the remote mobile phone without displaying the control code; and controlling said remote mobile phone based on said control code.

3. A method as in claim 2 wherein said control code represents a ringer tone to be played, and wherein said controlling comprises playing said ringer tone when displaying said text message.

4. A method as in claim 3 wherein said message is contained within a reserved sequence which is not used as part of the text message.

5. A method as in claim 2 wherein said control code comprises a plurality of ringer tones to be played, and wherein said controlling comprises playing said plurality of ringer tones in a sequence.

6. A method as in claim 2 further comprising determining if the remote mobile telephone has blocked playing said ringer tone; and playing said ringer tone only if said remote mobile telephone has not blocked said specified command.

7. A mobile telephone system, comprising:

a mobile telephone having a display and a processor with a capability of displaying a text message on the display, and operating to receive a message and displaying a text message, within said message, on the display, said processor in said mobile telephone operating to detect a specified control code for the mobile telephone in said message and controlling a ringer of the mobile telephone to play a series of ring tones according to said control code such that said mobile telephone rings according to said control code.

8. A telephone as in claim 7 further comprising an element which controls blocking the control code on the mobile telephone, and said processor detects the blocking and does not carry out the ring responsive to the control code if said aspect is detected.

9. A telephone as in claim 7, wherein said processor removes said control code from said message so that said control code will not be displayed, and displays the message without said control code.

10. A method of operating a text messaging system, comprising:

producing a message to be displayed on a remote mobile telephone, said message including all text characters including a text part of the message, and a control part of the message which is delimited by two reserved text characters within the message, said control part including at least one control code to control a ringer tone to be played on the remote mobile telephone;

receiving said message at said remote mobile telephone;

determining, at said remote mobile telephone, said control code within said text message;

removing said control code from said text message in said remote mobile telephone;

determining if the remote mobile telephone has selected blocking of external actuation of ringer tones;

controlling the ringer on the remote mobile telephone to play at least one ringing sequence based on information in said control code, only if said blocking has not been selected; and displaying said text message on the remote mobile phone without any indication of said control code.

11. A method as in claim 10, wherein said remote mobile telephone is a cellular telephone.

* * * * *